No. 720,843. PATENTED FEB. 17, 1903.
W. C. PETERS.
HOOK OR ATTACHMENT DEVICE.
APPLICATION FILED JULY 28, 1902.

NO MODEL.

Witnesses:

Inventor,
Walter C. Peters.
by Herbert W. Jenner.
Attorney

UNITED STATES PATENT OFFICE.

WALTER CLAY PETERS, OF ELY, ENGLAND.

HOOK OR ATTACHMENT DEVICE.

SPECIFICATION forming part of Letters Patent No. 720,843, dated February 17, 1903.

Application filed July 28, 1902. Serial No. 117,322. (No model.)

*To all whom it may concern:*

Be it known that I, WALTER CLAY PETERS, a subject of the King of Great Britain and Ireland, residing at Parkdale, Witcham, Ely, in the county of Cambridge, England, have invented new and useful Improvements in Hooks or Attachment Devices, of which the following is a specification.

This invention relates to improvements in hooks or attachment devices particularly suitable for use in connection with harness, although where made in different sizes they may be employed for various purposes for which they are suitable, the object being to provide a hook or attachment device that can be quickly released when required, but which shall possess great strength and be more reliable than the ordinary snap-hook, at the same time being capable of being attached or released with the same facility.

In order that this invention may be fully understood, I will now proceed to describe same with reference to the accompanying drawings, in which—

Figure 1:
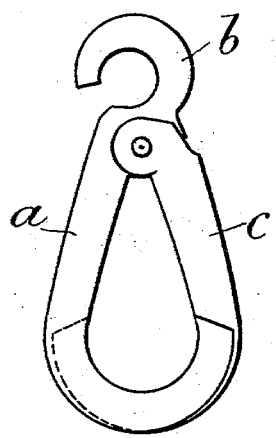
Figure 2:
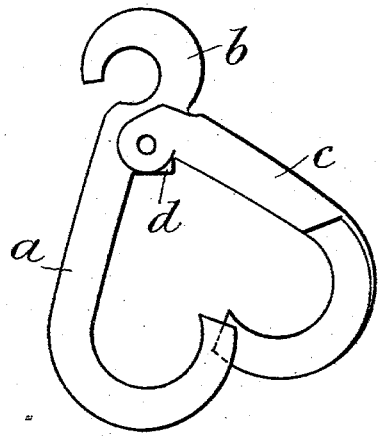
Figure 3:
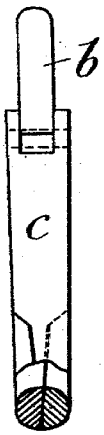
Figure 4:
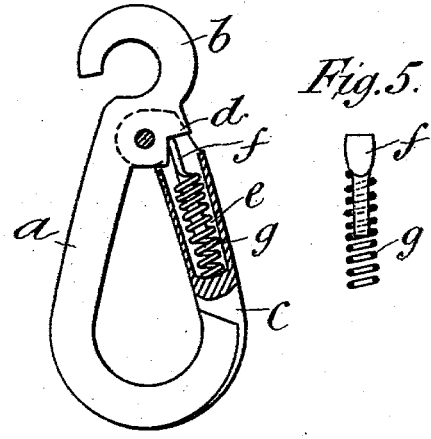
Figure 5:

Figure 1 is a front elevation of one form of hook constructed according to this invention, showing the hook in the closed position. Fig. 2 shows the hook in the open position. Fig. 3 is a side elevation, partly in section. Fig. 4 is a front elevation, partly in section, illustrating the spring mechanism normally retaining the hook in the closed position. Fig. 5 is a detailed view of the latter part.

This hook comprises an arm $a$, which may be formed integrally with a hook or ring, such as $b$, and an arm $c$, pivoted thereto, the lower extremities being reduced in thickness and overlapping, as shown, so as to produce a hook of uniform thickness throughout. The arm $a$ is formed with a shoulder $d$, and within the hollow upper extremity $e$ of the arm $c$, Fig. 4, a bearing-pin $f$ and spring $g$ are arranged, as shown, the bearing-pin being forced against the shoulder $d$ by the spring and tending normally to return the arm $c$ to and retain it in the closed position.

As hereinbefore stated, the hook may be made in various sizes, even small enough for use on a watch-chain, and may be formed integrally with an ordinary hook or ring of any required form, while where a double hook of this improved form is required a second hook may be formed as an integral part of the first, the two hooks projecting in opposite directions.

Having now described my invention, what I claim as new, and desire to secure by Letters Patent, is—

1. An improved hook or attachment device, consisting of an arm $a$ formed with a shoulder $d$ and ring or eye $b$, an arm $a$ pivoted thereto, and formed with a hollow upper extremity $e$, and a bearing-pin $f$ and an operating-spring $g$ contained within the hollow extremity of the arm $c$ and bearing against the shoulder $d$, substantially as described and shown.

2. In a hook or attachment device, a curved arm formed with a shoulder, a curved arm formed with a hollow upper part pivoted thereto, and a bearing-pin and an operating-spring arranged within the upper hollow part of the one arm and bearing against the shoulder of the other arm, for returning the arms to and retaining them in the closed position, substantially as set forth.

In testimony whereof I affix my signature in presence of two witnesses.

WALTER CLAY PETERS.

Witnesses:
CHAS. LEASON,
GODFREY SHEPHERD.